(12) United States Patent
Simula et al.

(10) Patent No.: US 8,398,182 B2
(45) Date of Patent: Mar. 19, 2013

(54) LIGHTWEIGHT WEAR RING

(75) Inventors: Glen Raymond Simula, Hancock, MI (US); Steven John Tarnowski, Calumet, MI (US)

(73) Assignee: GSE Technologies, LLC, Houghton, MI (US)

( * ) Notice: Subject to any disclaimer, the term of this patent is extended or adjusted under 35 U.S.C. 154(b) by 232 days.

(21) Appl. No.: 12/795,075

(22) Filed: Jun. 7, 2010

(65) Prior Publication Data

US 2011/0298274 A1 Dec. 8, 2011

(51) Int. Cl.
*B62D 55/24* (2006.01)

(52) U.S. Cl. .......................................... 305/194; 305/193

(58) Field of Classification Search .................. 305/137, 305/185, 193, 194, 199
See application file for complete search history.

(56) References Cited

U.S. PATENT DOCUMENTS

| | | | | |
|---|---|---|---|---|
| 2,984,524 A * | 5/1961 | Franzen | ........................ | 305/194 |
| 3,007,745 A * | 11/1961 | Even | ............................ | 305/200 |
| 3,606,497 A * | 9/1971 | Gilles | ........................... | 305/194 |
| 4,349,234 A * | 9/1982 | Hartmann | .................... | 305/194 |
| 4,572,587 A * | 2/1986 | Komp et al. | ................... | 305/137 |
| 4,607,892 A * | 8/1986 | Payne et al. | ................... | 305/137 |
| 4,818,041 A * | 4/1989 | Oertley | ........................ | 305/137 |
| 5,141,299 A * | 8/1992 | Korpi | ............................ | 305/137 |
| 5,171,074 A | 12/1992 | Seksaria et al. | | |
| 5,462,345 A * | 10/1995 | Purcell | ......................... | 305/199 |
| 7,137,675 B1 | 11/2006 | Simula et al. | | |
| 2003/0160506 A1* | 8/2003 | Averkamp et al. | ............ | 305/136 |
| 2010/0102623 A1* | 4/2010 | Mulligan | ..................... | 305/137 |
| 2011/0169325 A1* | 7/2011 | Kaufold et al. | ............... | 305/199 |

* cited by examiner

*Primary Examiner* — Kip T Kotter
(74) *Attorney, Agent, or Firm* — Brooks Kushman P.C.

(57) ABSTRACT

A segmented wear ring 40 for a tracked vehicle 10 road wheel 22 that cooperates with a track guide 32. The segmented wear ring 40 has at least two wear ring segments 42, and each of the wear ring segments 42 have a wear surface 50. The wear ring segments 42 are attached to a tracked vehicle wheel 22 such that the wear surfaces of each of the wear ring segments 42 form a substantially uninterrupted wear surface 50 designed to cooperate with a track guide 32.

19 Claims, 3 Drawing Sheets

LIGHTWEIGHT WEAR RING

The invention was made in part with Government support. The Government may have certain rights to the invention.

TECHNICAL FIELD

The invention relates to wear rings used on tracked vehicles.

BACKGROUND

Tracked vehicles have tracks comprised of individual track units linked together in a continuous loop. Road wheels roll upon the track units as the track units engage the ground. The road wheels are aligned with the track by center guides projecting from the track units into a track guide channel space between the side surfaces of the road wheels. Wear rings are affixed to the side surfaces of the tracked vehicle road wheels in the track guide channel groove and interface with the track guide. The wear ring prevents abrasion of the road wheel.

Wear rings extend the life of road wheels, but the wear rings need replacement due to the abrasion. In order to replace current wear rings the tracked vehicle road wheel must be removed. The removal of the road wheel raises the maintenance costs of operating tracked vehicles and decreases the tracked vehicle's readiness. To lower the number of times a tracked vehicle road wheel needs to be removed, heavier and thicker wear rings have been used. Heavier mass wear rings added to the tracked vehicle increases the operating costs of the tracked vehicles.

Among the references considered before filing this application are: U.S. Pat. No. 7,137,675 B1 to Simula et al., U.S. Pat. No. 5,171,074 to Seksaria et al., and U.S. Pat. No. 5,141,299 to Korpi.

SUMMARY

In one embodiment, a segmented wear ring for a tracked vehicle wheel cooperating with a track guide has at least two wear ring segments. The wear ring segments are attached to a tracked vehicle wheel such that the wear surfaces of each of the wear ring segments form a substantially uninterrupted wear surface designed to cooperate with a track guide.

In another embodiment, a segmented wear ring for a tracked vehicle wheel cooperating with a track guide has six wear ring segments. The wear ring segments are attached to a tracked vehicle wheel such that the wear surfaces of each of the wear ring segments form a substantially uninterrupted wear surface designed to cooperate with a track guide.

In still another embodiment, a segmented wear ring for a tracked vehicle wheel cooperating with a track guide has a plurality of wear ring segments. The wear ring segments are attached to the wheel such that the wear surfaces of the wear ring segments form a substantially uninterrupted wear surface and during use the track guide burnishes the wear surfaces of the wear ring segments creating an interfacial layer.

In a further embodiment, a segmented wear ring for a tracked vehicle wheel cooperating with a track guide has wear ring segments that are attached to the wheel with a means of affixing from a group consisting of, but not limited to, screws, bolts, nuts, rivets, staples, crimping, welding, soldering, brazing, taping, gluing, cementing, adhesives and chemical fasteners.

In yet another embodiment, a segmented wear ring for a tracked vehicle wheel cooperating with a track guide has wear ring segments that are integrally attached to the wheel using a process such as, but not limited to, casting the wheel around the wear ring segments.

In a still further embodiment, a segmented wear ring for a tracked vehicle wheel cooperating with a track guide has wear ring segments that include steel.

In a yet still further embodiment, a segmented wear ring for a tracked vehicle wheel cooperating with a track guide has wear ring segments that include a composite, such as, but not limited to, fiberglass, carbon fiber, ceramic, Kevlar, and metal matrix materials.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
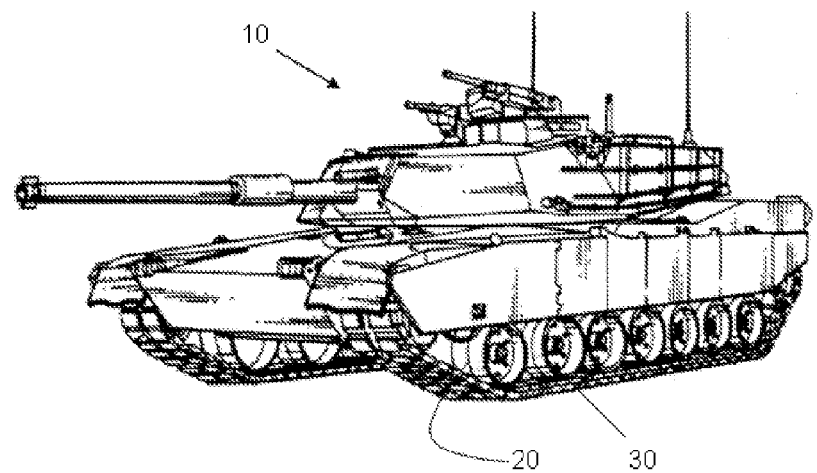
FIG. 1 is a perspective view of a tracked vehicle.

FIG. 1 shows a tracked vehicle 10 with a plurality of tracked vehicle road wheel sets 20 riding on top of a track 30.

Figure 2:
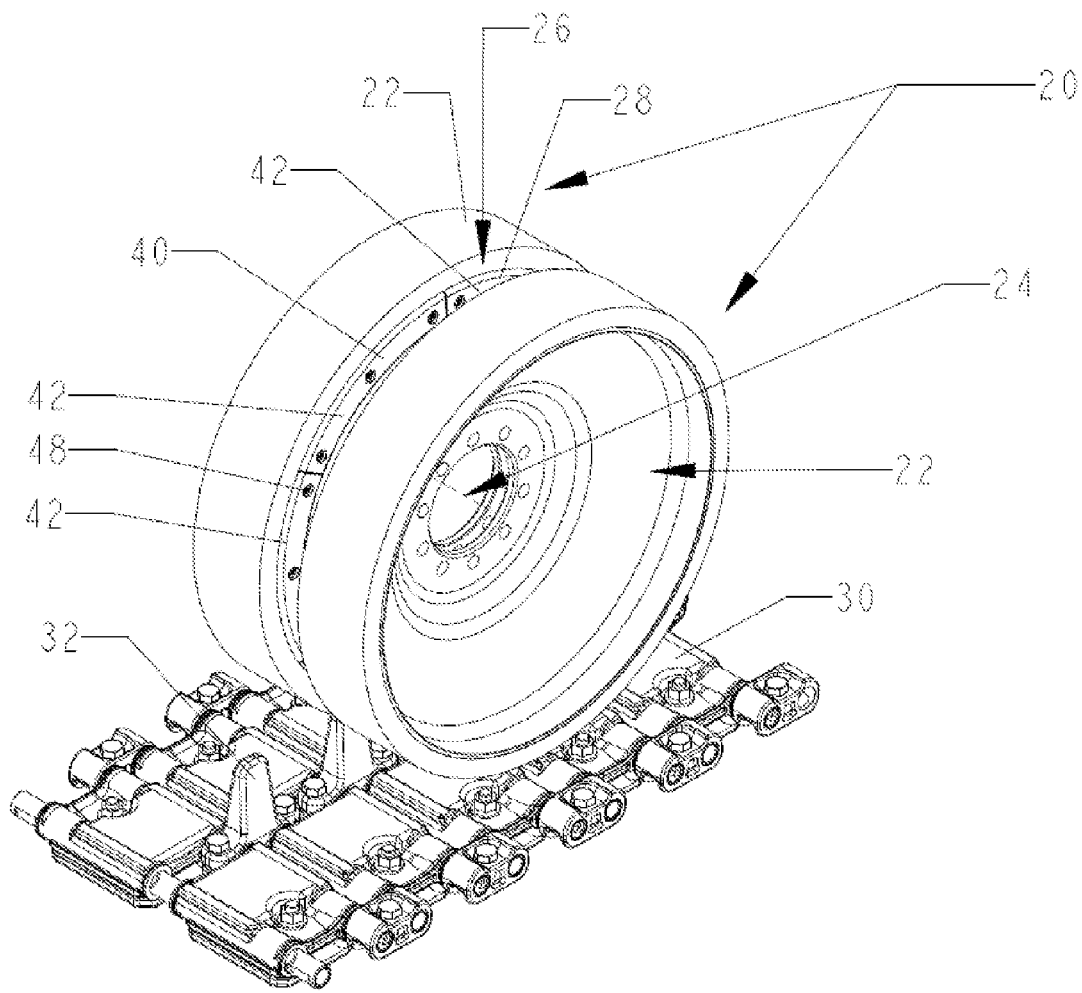
FIG. 2 is a partial perspective view of a set of tracked vehicle road wheels on a track showing the track guide channel, track guide and wear ring.
Figure 3:
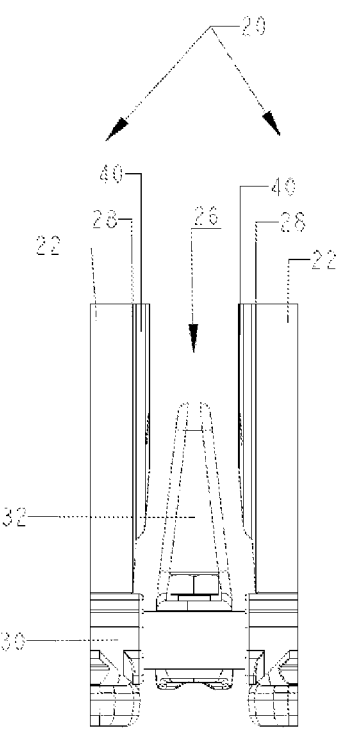
FIG. 3 is a partial front view of the set of tracked vehicle road wheels on the track of FIG. 2 showing the track guide channel, track guide and wear ring.

FIGS. 2 and 3 illustrate that a tracked vehicle road wheel set 20 comprises two road wheels 22 adjoined and rotating about a common axis 24. The two road wheels 22 are designed to define a track guide channel 26 wherein each road wheel 22 has a side surface 28 residing on both sides of the track guide channel 26. Wear ring 40 comprising of wear ring segments 42 are deployed around the common axis 24 and show a means for affixing 48 the wear ring segments 42 to the side surface 28 of the road wheel 22. Means for affixing 48 may include, but are not limited to, screws, bolts, nuts, rivets, staples, crimping, welding, soldering, brazing, taping, gluing, cementing, adhesives and chemical fasteners.

Wear ring 40 comprising of wear ring segments 42 may also be integrally attached to the wheel (not shown) using a process such as, but not limited to, casting the wheel around the wear ring segments. Casting processes may include, but are not limited to, investment casting, permanent mold and sand casting.

Wear ring segments 42 may be made out of steel or other metals, or may be a composite, such as, but not limited to, fiberglass, carbon fiber, ceramic, Kevlar, and metal matrix materials, or any combination of the above. Wear ring 40 comprising wear ring segments 42 may be lighter and thinner than solid wear rings as maintenance of the segmented wear rings is simpler, cheaper and requires less vehicle downtime. Lighter and more easily maintained wear rings results in more efficient and lower operation costs of tracked vehicles. In addition, during development it was discovered that thinner and lighter solid wear rings have a tendency to warp due to thermal cycling reducing both the life of the wear ring and the track guide, where as the segmented wear rings 42 with a substantially uninterrupted wear surface 50 do not have a tendency to warp, thus increasing the life of the system and providing a more uniform surface for the track guide 32 to contact.

Figure 4:
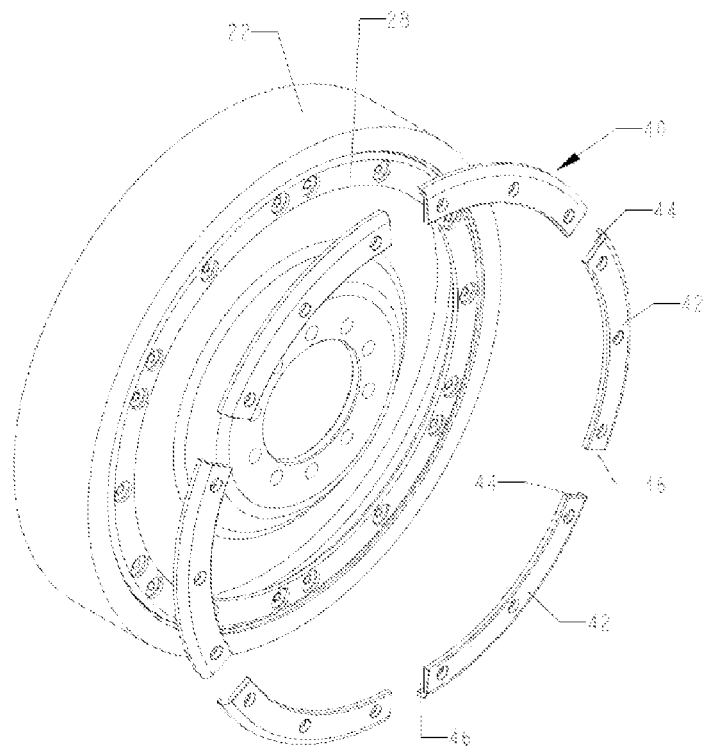
FIG. 4 is a perspective view of a single tracked vehicle road wheel with exploded segmented wear ring.

FIG. 4 shows a tracked vehicle road wheel 22 with an exploded view of wear ring 40 comprising a plurality of wear ring segments 42. The wear ring segments 42 are deployed around the common axis 24 and are assembled to the side surface 28 of the road wheel 22 such that the proximal end 44 of one wear ring segment 42 is juxtaposed to the distal end 46 of another wear ring segment 42. Juxtaposed as used here means physical contact or closely spaced. When assembled the wear ring segments 42 form a substantially uninterrupted surface (described below).

Figure 5:
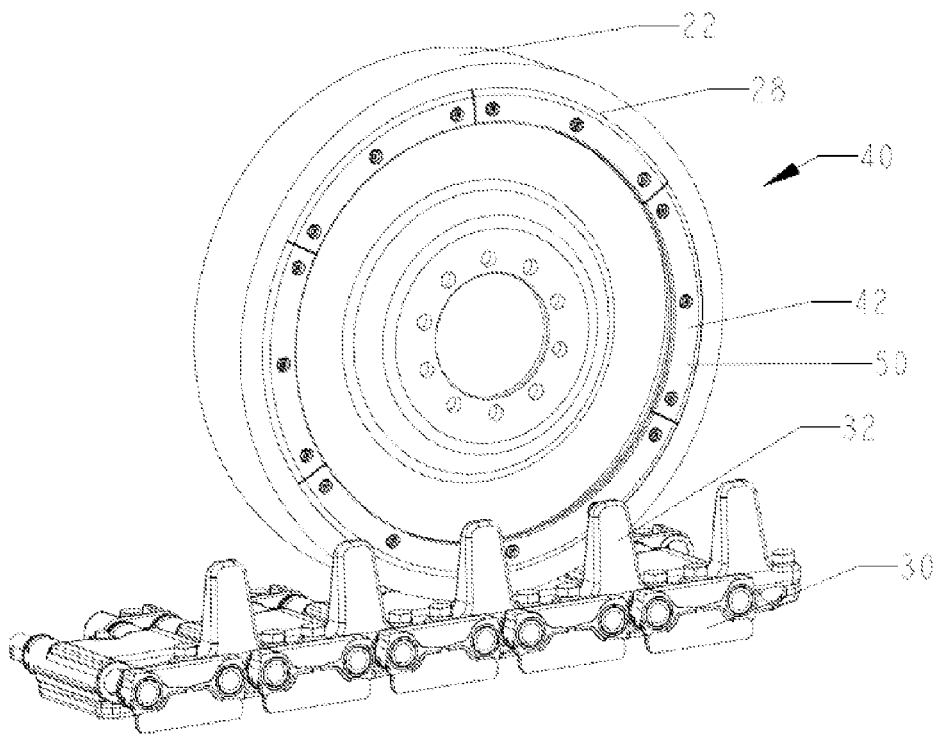
FIG. 5 is a perspective view of a single tracked vehicle road wheel on a cut-away track with visible wear ring segments prior to burnish.

FIG. 5 illustrates a pre-burnish view of wear ring 40 comprising wear ring segments 42 attached to the side surface 28 of road wheel 22 with means for affixing 48 forming a substantially uninterrupted wear surface. In this view wheel 22 is on track 30 and the track guide 32 is seen in contact with wear ring 40.

Figure 6:
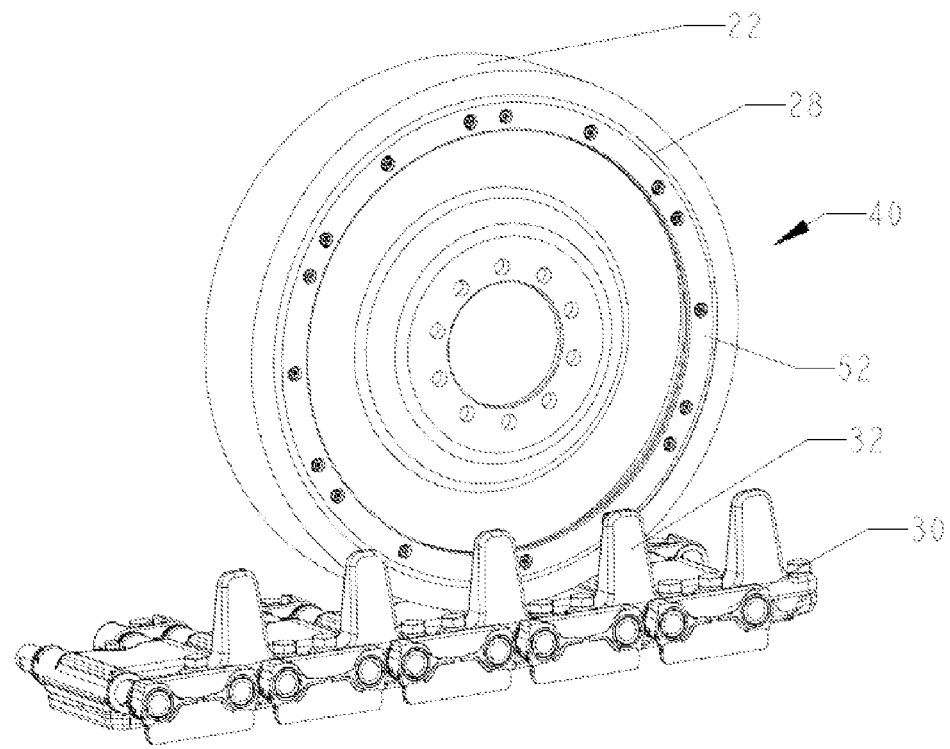
FIG. 6 is the perspective view of a single tracked vehicle road wheel on the cut-away track of FIG. 5 with non visible wear ring segments due to interfacial layer created by a burnish.

FIG. 6 illustrates the same view as FIG. 5, however the contact between track guide 32 and wear ring 40 has caused the substantially uninterrupted wear surface 50 to burnish creating an interfacial layer 52. The interfacial layer 52 of the wear ring segments 42 tends to hide the juxtaposed joints of the proximal end 44 and distal end 46 of juxtaposed wear ring segments 42. The interfacial layer 52, being made up of the same material as wear ring segments 42 as mentioned above, may include steel or other metals, may be a composite, or may include a mixture of steel and composite. Burnishing in this instance is a material transfer on the substantially uninterrupted surface 50 due to sliding contact with the track guide 32.

Without being bound by a particular theory or the material transfer mechanisms involved, burnishing appears to smear the texture of the substantially uninterrupted surface 50 creating an interfacial layer 52. The burnish may make the substantially uninterrupted surface 50 visually shinier, and may create an interfacial layer between the wear ring segments 42, while removing the separation lines created by the proximal 44 and distal 46 ends of juxtaposed wear ring segments 42. Material transfer during burnishing can be the result of, but not limited to, plastic deformation, thermal deformation, and mechanical or chemical deposition. A burnish may cause plastic deformation of the wear surface 50 of the wear ring segments 42 such as by smearing the top layer of one wear ring segment 42 on to another. A burnish may also cause thermal deformation such as the melting and resolidifying of the abutting top layer surfaces of the proximal 44 and distal 46 ends of wear ring segments 42 similar to that of welding. A burnish may further cause mechanical or chemical deposition in which the track guide 32 deposits material on to the wear surface covering the proximal 44 and distal 46 end top layer surfaces of the wear ring segments 42. A burnish may also result in any combination of the above, as well as other material transfer mechanisms.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wear ring system for a tracked vehicle with a plurality of wheels and one or more tracks that cooperate with the plurality of wheels, the system comprising:
    a plurality of wheels with each wheel having a side surface facing a track guide of a respective track; and
    a wear ring associated with at least one of the plurality of wheels, the wear ring including two or more wear ring segments, the two or more wear ring segments being deployed around a common axis, each of the two or more wear ring segments having a proximal end and a distal end, at least some of the two or more wear ring segments being directly attached to the side surface of at least one of the plurality of wheels such that the proximal end of at least one wear ring segment is juxtaposed to the distal end of at least one adjacent wear ring segment so as to form a wear ring with a substantially uninterrupted wear surface, the wear ring being capable of burnishing during use on the tracked vehicle, thereby creating an interfacial layer that connects adjacent wear ring segments to form an uninterrupted wear surface.

2. The wear ring system of claim 1, wherein the two or more wear ring segments are attached to the wheel with a means for affixing.

3. The wear ring system of claim 1, wherein the two or more wear ring segments are six wear ring segments associated with at least one of the plurality of wheels.

4. The wear ring system of claim 1, wherein the two or more wear ring segments include steel.

5. The wear ring system of claim 1, wherein the two or more wear ring segments include a composite.

6. The wear ring system of claim 1, wherein the interfacial layer connects the proximal end of the one wear ring segment to the distal end of the adjacent wear ring segment, removing separation between the wear ring segments.

7. The wear ring system of claim 1, wherein burnishing is a material transfer from the one wear ring segment to the adjacent wear ring segment.

8. The wear ring system of claim 1, wherein the burnishing is a plastic deformation of the substantially uninterrupted wear surface smearing the substantially uninterrupted wear surface to become the uninterrupted wear surface.

9. A wear ring system for a tracked vehicle with a plurality of wheels and a track that cooperates with the plurality of wheels, the system comprising:
   a track guide extending from a track; and
   a plurality of wheels with a side surface, wherein at least two of the plurality of wheels are adjoined and rotating about a common axis with the opposing side surfaces of the at least two wheels define a track guide channel for directing the track guide; and
   a wear ring associated with at least one of the plurality of wheels, the wear ring including two or more wear ring segments each having a proximal end and a distal end, the wear ring segments being deployed around a common axis and directly attached to the side surface of at least one wheel, such that the proximal end of at least one wear ring segment is juxtaposed to the distal end of an adjacent wear ring segment so as to form a wear ring with a substantially uninterrupted wear surface, and the track guide is capable of contacting the two or more wear ring segments, thereby causing the substantially uninterrupted wear surface to burnish and create an interfacial layer that connects the proximal end of the at least one wear ring segments to the distal end of the adjacent wear ring segment to form an uninterrupted wear surface.

10. The wear ring system in claim 9, wherein the two or more wear ring segments are six wear ring segments attached to the side surface of at least one wheel.

11. The wear ring system of claim 9, wherein the two or more wear ring segments include steel.

12. The wear ring system of claim 9, wherein the two or more wear ring segments include a composite.

13. The wear ring system of claim 9, wherein the interfacial layer connecting the proximal end of the at least one wear ring segments to the distal end of the adjacent wear ring segment removes separation between the adjacent wear ring segments.

14. The wear ring system of claim 9, wherein the system is designed to allow the track guide to contact the wear ring segments causing a material transfer to occur between the wear ring segments providing the uninterrupted wear surface.

15. A segmented wear ring for a tracked vehicle wheel cooperating with a track guide, the segmented wear ring comprising:
    at least two wear ring segments, each of the at least two wear ring segments having a wear surface,
    wherein the at least two wear ring segments are directly attached to a side surface of a the tracked vehicle wheel that faces the track guide such that the wear surfaces of each of the at least two wear ring segments form a substantially uninterrupted wear surface designed to cooperate with the track guide and during use the wear surfaces burnish creating an interfacial layer shared by the at least two wear ring segments connecting the at least two wear ring segments and forming an uninterrupted wear surface between the at least two wear ring segments.

16. The segmented wear ring of claim 15, wherein the interfacial layer includes steel.

17. The wear ring system of claim 15, wherein the interfacial layer includes a composite.

18. The segmented wear ring of claim 15, wherein the interfacial layer includes a mixture of steel and composite.

19. The segmented wear ring of claim 15, wherein the interfacial layer shared by the at least two wear ring segments removes separation lines between the at least two wear ring segments.

* * * * *